US009150096B2

(12) United States Patent
Takanaga et al.

(10) Patent No.: US 9,150,096 B2
(45) Date of Patent: Oct. 6, 2015

(54) GRILL SHUTTER STRUCTURE OF VEHICLE

(71) Applicant: MAZDA MOTOR CORPORATION, Hiroshima (JP)

(72) Inventors: Yuhki Takanaga, Aki-gun (JP); Kazuma Kondou, Higashihiroshima (JP); Manabu Yamaoka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/191,204

(22) Filed: Feb. 26, 2014

(65) Prior Publication Data

US 2014/0291056 A1    Oct. 2, 2014

(30) Foreign Application Priority Data

Mar. 29, 2013  (JP) ................. 2013-074196

(51) Int. Cl.
*B60K 11/08*    (2006.01)
*B60R 19/52*    (2006.01)

(52) U.S. Cl.
CPC ............ *B60K 11/085* (2013.01); *B60R 19/52* (2013.01); *B60R 2019/527* (2013.01); *B60Y 2306/01* (2013.01)

(58) Field of Classification Search
CPC ........ B60K 11/00; B60K 11/04; B60K 11/06; B60K 11/08; B60K 11/085; F01P 2001/005
See application file for complete search history.

(56) References Cited

U.S. PATENT DOCUMENTS

| 3,506,082 | A | * | 4/1970 | Cadiou | 180/68.1 |
| 5,046,550 | A | * | 9/1991 | Boll et al. | 165/41 |
| 5,915,490 | A | * | 6/1999 | Wurfel | 180/68.1 |
| 2004/0144522 | A1 | * | 7/2004 | Bauer et al. | 165/67 |
| 2010/0147611 | A1 | * | 6/2010 | Amano et al. | 180/68.1 |
| 2011/0181062 | A1 | * | 7/2011 | Bernt et al. | 293/102 |
| 2012/0193156 | A1 | * | 8/2012 | Hirano | 180/68.1 |
| 2013/0000999 | A1 | * | 1/2013 | Naito et al. | 180/68.1 |

FOREIGN PATENT DOCUMENTS

| EP | 2407333 A1 | 1/2012 |
| JP | 2004-276712 A | 10/2004 |
| JP | 2004-299522 A | 10/2004 |

* cited by examiner

*Primary Examiner* — Frank Vanaman
(74) *Attorney, Agent, or Firm* — Studebaker & Brackett PC

(57) ABSTRACT

A grill shutter unit comprises a shutter unit provided in back of a traveling-air introductory port formed at a front end of a vehicle body and including shutter members, and a traveling-air guide member including a guide frame portion provided at an outer peripheral edge portion of the shutter unit and a seal portion provided to extend forward continuously from a front end of the guide frame portion and be made from soft synthetic resin having more flexibility than the frame portion, wherein the grill shutter unit is configured such that when the shutter members are closed, a seal portion of the traveling-air guide member is pressed against an outer peripheral wall face of the traveling-air introductory port by pressure of traveling air shut off by the shutter members closed.

9 Claims, 13 Drawing Sheets

GRILL SHUTTER STRUCTURE OF VEHICLE

BACKGROUND OF THE INVENTION

The present invention relates to a grill shutter structure of a vehicle, and particularly relates to a grill shutter structure of a vehicle which comprises a shutter unit including a shutter member operative to be open or closed and a traveling-air guide member provided to extend forward from an outer peripheral edge portion of the shutter unit.

Conventionally, it is known to provide a grill shutter unit capable of adjusting the amount of traveling air introduced into an engine room through a traveling-air introductory port at a front grill or the like formed at a front end of a vehicle in order to prevent any improper combustion which may be caused by excessive cooling of an engine, a radiator and the like. The traveling air introduced into the engine room flows down a tunnel portion of a floor panel and other portions during a vehicle traveling, which may cause improper air turbulence around the vehicle. Accordingly, it has been desired, in order to prevent any traveling-resistance increase and fuel-economy (gas-mileage) deterioration of the vehicle caused by the traveling-resistance increase, that the grill shutter unit capable of adjusting the amount of traveling air introduced into the engine room is installed to the vehicle.

The grill shutter unit substantially comprises a shutter unit including a shutter operative to be open or closed for a traveling-air introductory port, an electromotive actuator operative to open or close the shutter, and others. A movable grill shutter for a vehicle disclosed in EP 2407333 A1 is arranged as a unit at a front grill opening portion, and it comprises a left-side first fin (left-side shutter) equipped with a first support shaft, a right-side second fin (right-side shutter) equipped with a second support shaft, a first output shaft operative to open or close the first fin, a second output shaft operative to open or close the second fin, and an actuator arranged between the first and second fins. Further, first and second joints are provided respectively between the first and second output shafts and the first and second support shafts.

It is also known, in order to improve the layout of a grill shutter unit and the design flexibility inside an engine room, to provide a structure in which the grill shutter unit is attached to a shroud member supporting a radiator, condenser and others, and the grill shutter unit and a traveling-air introductory port at a front grill or the like which is formed at a bumper face. According to a duct structure of a front portion of a vehicle disclosed in Japanese Patent Laid-Open Publication No. 2004-299522, a front grill formed at a bumper face and a traveling-air introductory port formed at a lower side of the front grill are provided, a duct device (grill shutter unit) attached to a radiator core support (shroud member) is provided between the front grill and the traveling-air introductory port and the radiator core support, and the duct device comprises plural duct portions operative to supply the traveling air to the radiator from the front grill and the traveling-air introductory port and shutters operative to pass or shut off the traveling air flowing down in the duct portions.

In general, the shroud member, which is of substantially a rectangular frame shape, is required to have a light weight, ensuring the support rigidity of the radiator, condenser and others as well as the strength as a vehicle-body constituting member. Therefore, the shroud member is made from a hard synthetic resin material containing glass fibers or the like, and attached to a vehicle body via an attaching bracket provided at front end portions of a pair of right-and-left front side frames. At front ends of the pair of right-and-left front side frames are arranged a pair of crash cans which extend forward respectively. A bumper reinforcement extending in a vehicle width direction is provided at respective front ends of the crash cans, and its front side area is covered with a bumper face. Thus, when a head-on collision of the vehicle happens, the crash cans provided at the front ends of the front side frames crush so that a collision load can be absorbed thereby and the safety of a passenger can be ensured.

It happens sometimes when rain or water, melt snow or the like which are splashed from a road surface come in through the traveling-air introductory port and some of them attaches itself onto surfaces of the shutters. Herein, since the water on the shutter surfaces causes the shutters to be frozen in the cold time, there is a concern that an opening/closing operation of the shutters may deteriorate. Accordingly, it has been proposed that an electric-conductive resilient member is attached to a lower end portion of each shutter so that the shutters can be prevented from being frozen in the cold time (see Japanese Patent Laid-Open Publication No. 2004-276712).

The grill shutter unit of the above-described second patent document is superior in layout and design flexibility, compared to the grill shutter unit of the above-described first patent document. Further, in the duct structure of the vehicle front portion of the above-described second patent document, since the grill shutter unit is arranged in back of and apart from the traveling-air introductory port, any breakage of the grill shutter unit which may be caused by interference of the grill shutter unit with the bumper reinforcement can be avoided in a case of a small collision of the vehicle. In a heavy collision of the vehicle in which the bumper reinforcement retreats greatly, however, since the distance between the bumper reinforcement and the front ends of the front side frames decreases according to compressive deformation of the crash cans, there is a concern that the grill shutter unit may be broken by the collision load. In the duct structure of the vehicle front portion of the above-described second patent document, since the grill shutter unit including the shutter unit and the duct portion is configured as a unit, it becomes necessary to exchange an entire part of the grill shutter unit even when part of the front side portion of the duct portion gets broken. Consequently, costs of repair may increase, so that there is a problem in that the repairability may deteriorate.

Further, in the duct structure of the vehicle front portion of the above-described second patent document, since the shutters are arranged in back of the traveling-air introductory port and also the duct portion extending longitudinally to guide the traveling air from the traveling-air introductory port to the shutter unit is provided, some traveling air comes into the engine room through a gap formed between a tip of the duct portion and the traveling-air introductory port, so that there is a concern that the fuel economy (gas mileage) may deteriorate because of the improper combustion caused by the excessive cooling or the traveling-resistance increase. Herein, while it may be considered to design such that the tip of the duct portion contacts the traveling-air introductory port tightly, assembling of both the grill shutter unit and the bumper reinforcement is not so easy that there is a problem in that the assembling workability may deteriorate. Moreover, in this case in which the tip of the duct portion contacts the traveling-air introductory port, the grill shutter unit may get broken easily because it comes to interfere with the bumper reinforcement even in the light vehicle collision.

SUMMARY OF THE INVENTION

An object of the present invention is to provide a grill shutter structure of a vehicle which can improve both the repairability and the assembling workability, ensuring the fuel economy. Another object of the present invention is to provide a grill shutter structure of a vehicle which can improve both the fuel economy and the opening/closing operation of the shutters, ensuring the layout and the design flexibility.

According to the present invention, there is provided a grill shutter structure of a vehicle, comprising a shutter unit provided in back of a traveling-air introductory port formed at a front end of a vehicle body and including a shutter member operative to be open or closed, and a traveling-air guide member provided to extend forward from an outer peripheral edge portion of the shutter unit, wherein the grill shutter structure is configured such that when the shutter member is closed, a front end portion of the traveling-air guide member is pressed against at least a portion of an outer peripheral wall face of the traveling-air introductory port by pressure of traveling air shut off by the shutter member closed.

According to the present invention, since the front end portion of the traveling-air guide member is pressed against at least a portion of the outer peripheral wall face of the traveling-air introductory port by the pressure of the traveling air shut off by the shutter member closed, substantially no gap is formed between the traveling-air guide member and the traveling-air introductory port when the shutter member is closed regardless of the design at the time of assembling, so that the traveling air can be prevented from coming into the engine room improperly. Accordingly, the fuel economy of the vehicle can be kept in an appropriate state. Further, since the traveling-air guide member is provided to extend forward from the outer peripheral edge portion of the shutter unit, even in a case in which the vehicle has a head-on collision and accordingly the traveling-air guide member gets broken, the repair can be properly accomplished substantially by exchanging only the traveling-air guide member itself. Accordingly, the repairability can be improved.

According to an embodiment of the present invention, the traveling-air guide member comprises a frame portion which is provided at the outer peripheral edge portion of the shutter unit and a seal portion which is provided to extend forward continuously from a front end of the frame portion and made from soft synthetic resin having more flexibility than the frame portion. Thereby, since the frame portion is provided at the outer peripheral edge portion of the shutter unit, the support rigidity and the assembling workability of the traveling-air guide member can be improved. Further, since the front end portion of the traveling-air guide member has some flexibility, any damage of the traveling-air guide member which may be caused by its contact with members provided around the traveling-air inductor port when the traveling-air guide member is assembled in back of the traveling-air inductor port can be properly avoided. Accordingly, the assembling workability can be improved. Moreover, breakage preventing of the traveling-air guide member can be achieved, and the fuel economy can be improved by contacting of the traveling-air guide member with the traveling-air introductory port.

According to another embodiment of the present invention, the vehicle comprises a bumper reinforcement provided at the front end of the vehicle body and a shroud member held at the bumper reinforcement, a lower end portion of the bumper reinforcement is provided in the vicinity of an upper wall portion of the seal portion of the traveling-air guide member, and the shutter unit is arranged in front of and near the shroud member and fixed to a front wall portion of the shroud member. Thereby, since the shroud member moves rearward synchronously as the bumper reinforcement retreats in the vehicle head-on collision, the breakage preventing of the traveling-air guide member can be further properly achieved. After the shutter unit and the shroud member are previously assembled as an assembly unit, the traveling-air guide member can be assembled to the shutter unit in a subsequent step. Accordingly, the assembling workability can be further improved.

According to another embodiment of the present invention, when the traveling-air guide member is assembled to the shutter unit fixed to the front wall portion of the shroud member, there exists a gap between the front end portion of the traveling-air guide member and the bumper reinforcement. Thereby, assembling of the traveling-air guide member to the shutter unit can be facilitated.

According to another embodiment of the present invention, the vehicle comprises a leg sweeping member which is provided at a lower portion of the front end of the vehicle body, the leg sweeping member being configured to contact a lower face of a lower wall portion of the seal portion of the traveling-air guide member. Thereby, the traveling air can be prevented from coming into the engine room by providing substantially no gap formed between the traveling-air guide member and the traveling-air inductor port, ensuring the leg flicking. Accordingly, the fuel economy of the vehicle can be kept in the appropriate state.

According to another embodiment of the present invention, a recess portion for draining is provided at respective lower portions of the shutter unit and the traveling-air guide member, the recess portion for draining being configured to be concaved downward at respective central portions, in a vehicle width direction, of the respective lower portions. Thereby, since the traveling-air guide member performs the collection function of water, any deterioration of the opening or closing of the shutter member which may be caused by the water freezing can be properly restrained by collecting and draining the water remaining around the shutter member.

Herein, the above-described recess portion for draining preferably comprises a collection portion to collect water and a slant portion to guide the water collected by the collection portion, the slant portion being provided at a front end portion of the collection portion and slants forward and downward. Thereby, since the traveling-air guide member performs the function of guiding the water collected from around the shutter member to a position which is located apart from the shutter member, the deteriorating of the opening or closing of the shutter member can be further properly restrained.

According to another embodiment of the present invention, the vehicle comprises a leg sweeping member provided at the lower portion of the front end of the vehicle body, a groove configured to be concaved downward at a central portion, in the vehicle width direction, of the leg sweeping member, and plural drain holes formed at the groove, and the slant portion of the recess portion for draining is provided such that a front end thereof contacts a rear-side portion of the groove. Thereby, since the water collected from around the shutter member is drained outside through the plural drain holes, the deteriorating of the opening or closing of the shutter member can be surely restrained.

According to another embodiment of the present invention, the above-described groove is configured to extend in the vehicle width direction so as to cause the leg sweeping member to bend downward at a point of the groove when a collision load is inputted to the leg sweeping member, and an outward side of the recess portion for draining is covered with a portion of said traveling-air guide member. Thereby, in a case in which some object which is harder than a pedestrian hits against the leg sweeping member so that an excessive (large) load is inputted, the leg sweeping member bends downward easily, thereby protecting vehicle components, such as a shutter unit or shroud member. Further, since the outward side of the recess portion for draining (part of the groove which may not expected to perform draining, for example) is covered with a portion of the traveling-air guide member, preventing damages against a light collision, reducing the traveling (aerodynamic) resistance, and efficient draining can be achieved at the same time.

According to another embodiment of the present invention, the traveling-air guide member is an integral different-kind resin molded member, and the frame portion of the traveling-air guide member is configured to be attachable to an outer peripheral edge portion of the shutter unit. Thereby, since the traveling-air guide member is manufactured trough substantially a one-time molding process so that the frame portion and the seal portion can be integrally formed together with a high engagement force, the productivity of the traveling-air guide member can be improved. Moreover, since the assembly workability of the traveling-air guide member is improved, the repairability can be further improved.

According to another embodiment of the present invention, a portion of the front end portion of the traveling-air guide member is configured to slant so as to expand forward and outward, and a cut-out portion for promoting deformation is formed at a position of the front end portion which is located between the slant-shaped portion and a side corner portion of the front end portion. Thereby, the traveling air can be properly guided by the slant-shaped portion of the traveling-air guide member when the shutter member is closed, and also the slant-shaped portion is configured to be deformable so as to be easily pressed against the outer peripheral wall face of the traveling-air introductory port by forming the cut-out portion despite the side corner portion of the front end portion generally having a high rigidity.

Other features, aspects, and advantages of the present invention will become apparent from the following description which refers to the accompanying drawings.

DETAILED DESCRIPTION OF THE INVENTION

Figure 1:
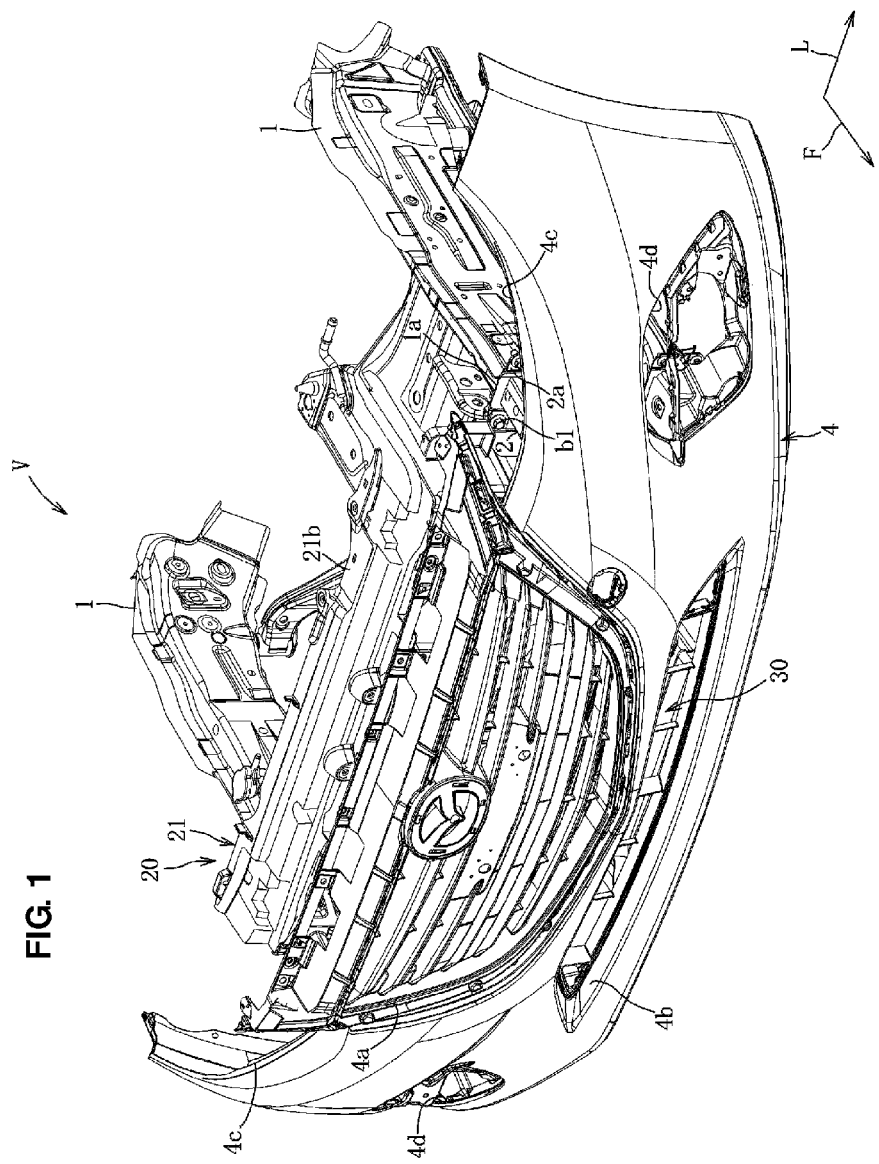
FIG. 1 is a perspective view of a vehicle equipped with a grill shutter unit according to an embodiment of the present invention, when viewed obliquely from a vehicle front side and a vehicle upper side.

Hereinafter, the present invention will be described based on an embodiment referring to the accompanying drawings. In the figures, an arrow F shows a direction of a vehicle front side and an arrow L shows a direction of a vehicle left side.

An embodiment of the present invention will be described referring to FIGS. 1-13. A vehicle V, to which the present invention is applied, comprises a pair of right-and-left front side frames 1 which extend longitudinally, a pair of right-and-left crash cans 2 which are fixed to respective front ends of the pair of front side frames 1, a bumper reinforcement 3 which is connected to respective front ends of the right and left crash cans 2 and extends in a vehicle width direction, a rectangular-frame shaped shroud member 20 which is fixed to the bumper reinforcement 3, a grill shutter unit 30 which is fixed to the shroud member 20, a bumper face 4 which is arranged at a front end portion of a vehicle body, and so on.

First, some major vehicle-body constituting members of the vehicle body V will be described. As shown in FIGS. 1, 3, 4 and 6, the pair of right-and-left front side frames 1 are arranged apart from each other in the vehicle width direction, and a flange 1a which projects vertically and laterally is welded to a front end of each of the pair of right-and-left front side frames 1. A flange 2a which projects vertically and laterally is welded to a rear end of each of the pair of right-and-left crash cans 2 formed in a quadrilateral tube shape, which is connected to the above-described flange 1a by plural bolts b1. Size and shape of each of the crash cans 2 are configured such that the collision energy can be properly absorbed through their compressive deformations which are caused by the collision load acting from the vehicle front via the bumper reinforcement 3 in a vehicle collision in order to achieve their energy absorption performance.

As shown in FIGS. 3-6, 12 and 13, the bumper reinforcement 3 connected to the both front ends of the pair of right-and-left crash cans 2 extends in the vehicle width direction, curving forward at a central portion thereof and having a closed cross section. The bumper reinforcement 3 comprises a base plate 6 having substantially a U-shaped cross section and a plate-shaped closing plate 7. The base plate 6 comprises a body portion 6a having substantially a U-shaped cross section, an upper flange portion 6b extending upward from an upper end portion of the body portion 6a, an upper horizontal wall portion 6c bending from an upper end portion of the upper flange portion 6b and extending rearward, a lower flange portion 6d extending downward from a lower end portion of the body portion 6a, and a lower horizontal wall portion 6e bending from a lower end portion of the lower flange portion 6d and extending rearward. A rear wall portion of the body portion 6a is connected to a front end portion of the body portion 6a of the pair of right-and-left crash cans 2. As shown in FIGS. 4, 6-8, a pair of right-and-left attaching brackets 25 which support the shroud member 20 at the bumper reinforcement 3 with a specified distance are joined to back-side portions of the bumper reinforcement 3 which are located between the pair of right-and-left crash cans 2. The pair of right-and-left attaching brackets 25 extend rearward from the rear wall portion of the body portion 6a, and a pair of upper-and-lower bolt holes h6 are provided at the rear wall portion of the body portion 6a.

Figure 3:
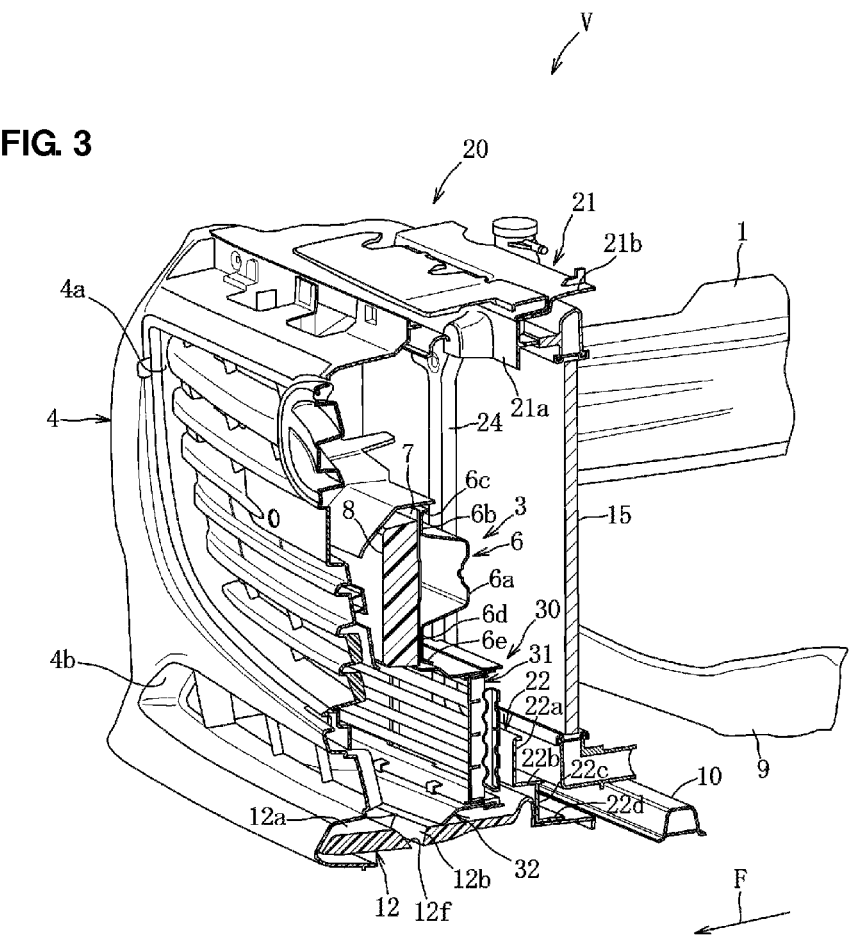
FIG. 3 is a sectional view taken along line III-III of FIG. 2.
Figure 12:
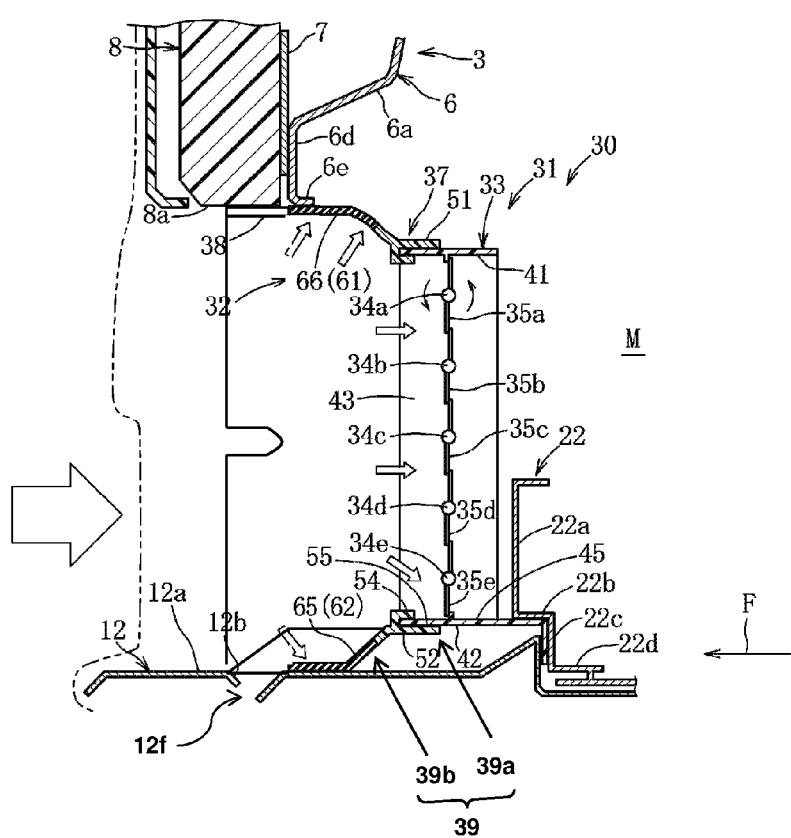
FIG. 12 is a sectional view of a major portion with a shutter member closed.
Figure 13:
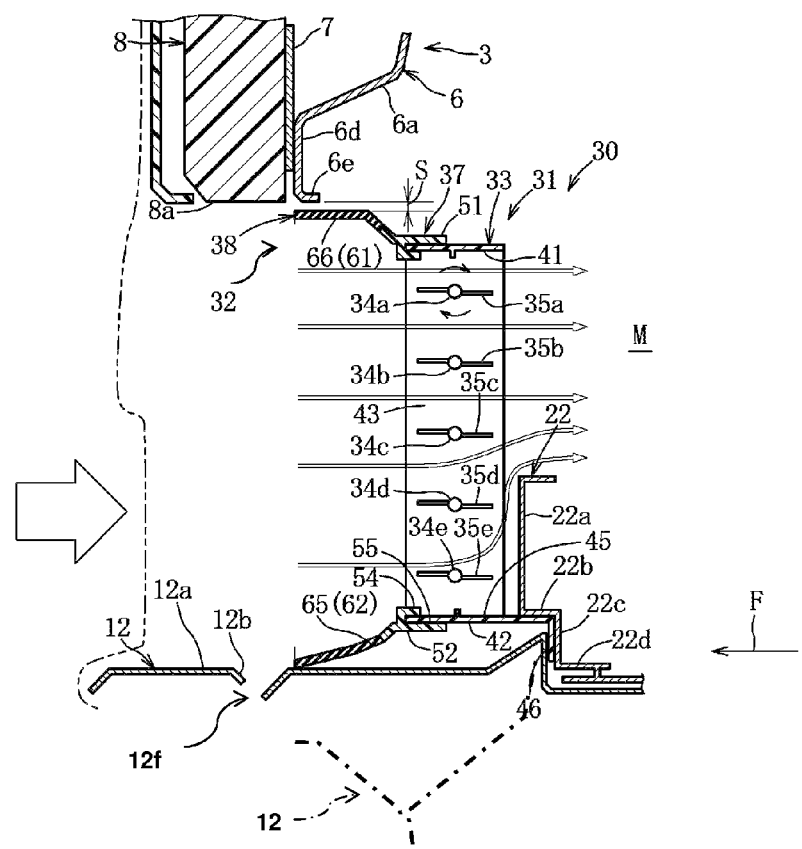
FIG. 13 is a sectional view of the major portion with the shutter member opened.

As shown in FIGS. 3, 12 and 13, the closing plate 7 is welded to the upper flange portion 6b and the lower flange portion 6d, and forms, cooperating with the base plate 6, a closed-cross section portion extending in the vehicle width direction. An impact-absorbing body 8 which is made of a foamed-resin molded body, such as urethane form, is arranged before the closing plate 7. A lower wall portion 8a of the impact-absorbing body 8 is located substantially at the same level as the lower horizontal wall portion 6e such that the both portions 8a, 6e are substantially flat in the longitudinal direction. Size and shape of the impact-absorbing body 8 are configured such that the collision energy can be properly absorbed through its compressive deformation which is crushed by the collision load acting from the front via the bumper face 4 and the bumper reinforcement 3 in the vehicle collision in order to achieve its energy absorption performance.

Figure 4:
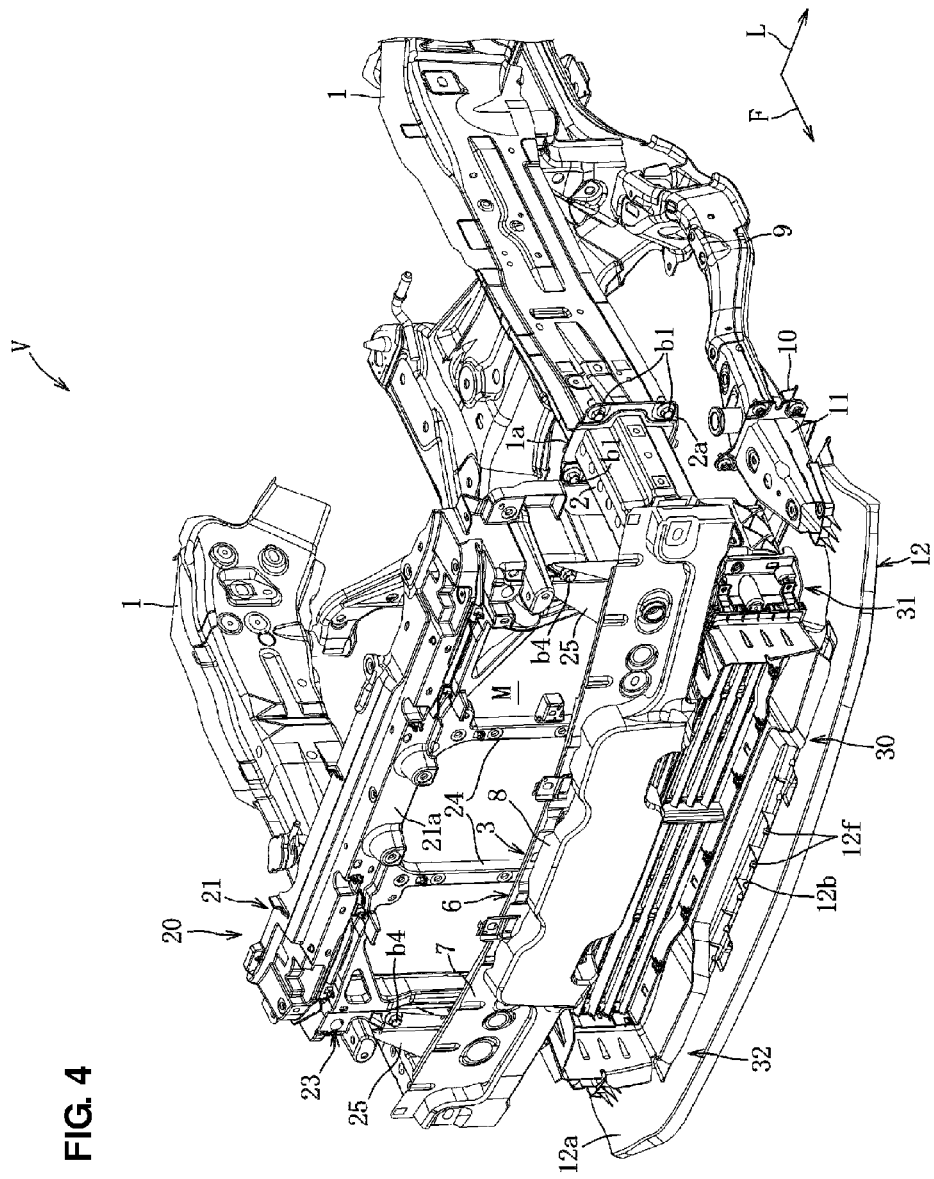
FIG. 4 is a perspective view showing a state in which a bumper face is removed from the vehicle shown in FIG. 1.
Figure 5:
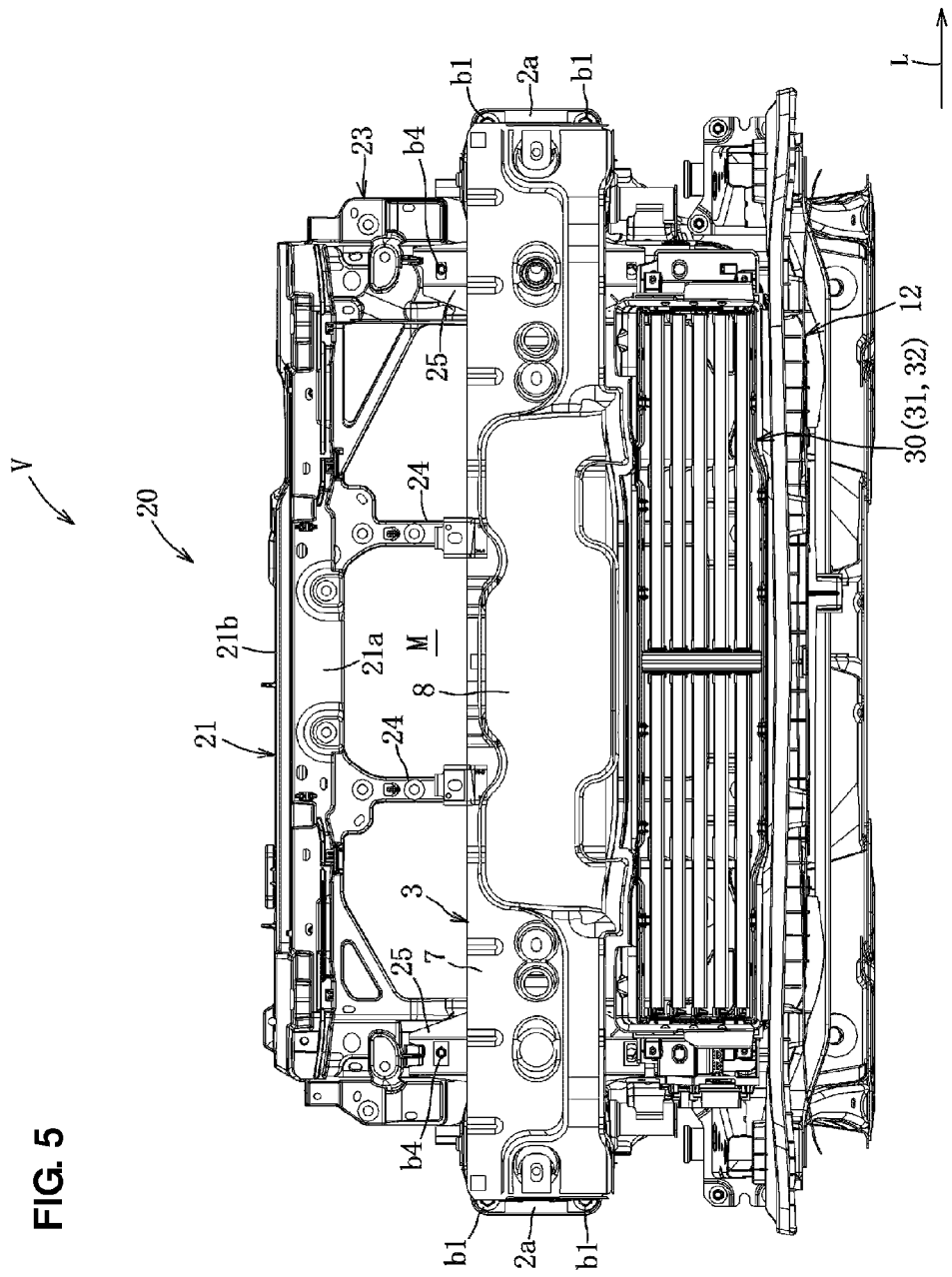
FIG. 5 is an elevational view of the vehicle shown in FIG. 4.
Figure 6:
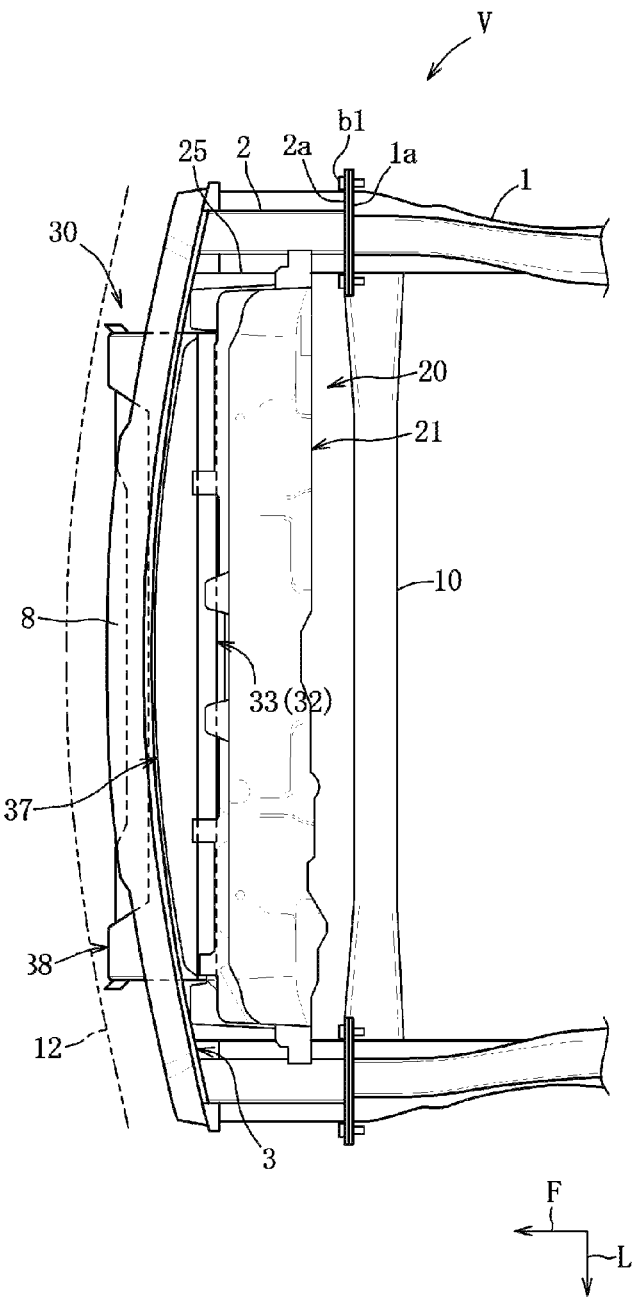
FIG. 6 is a plan view of the vehicle shown in FIG. 4.
Figure 7:
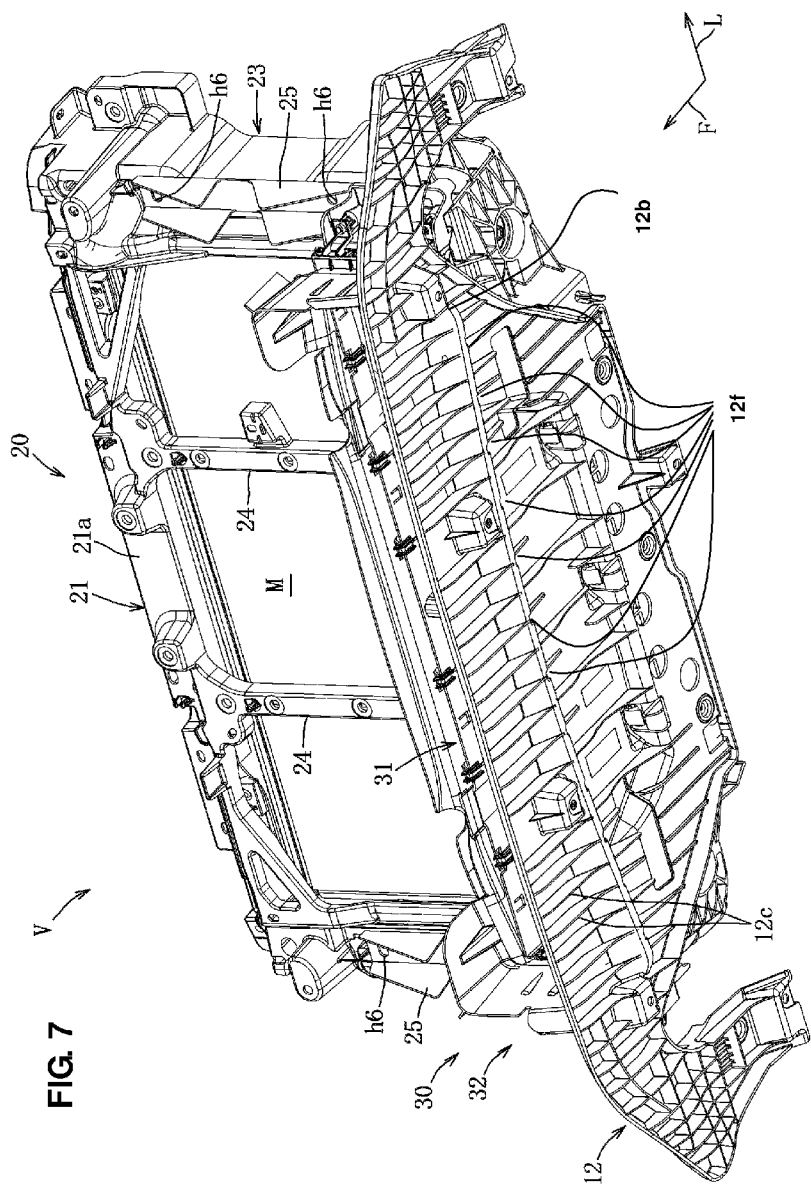
FIG. 7 is a perspective view showing a state in which a bumper reinforcement is removed from the vehicle shown in FIG. 4, when viewed obliquely from the vehicle front side and a vehicle lower side.
Figure 8:
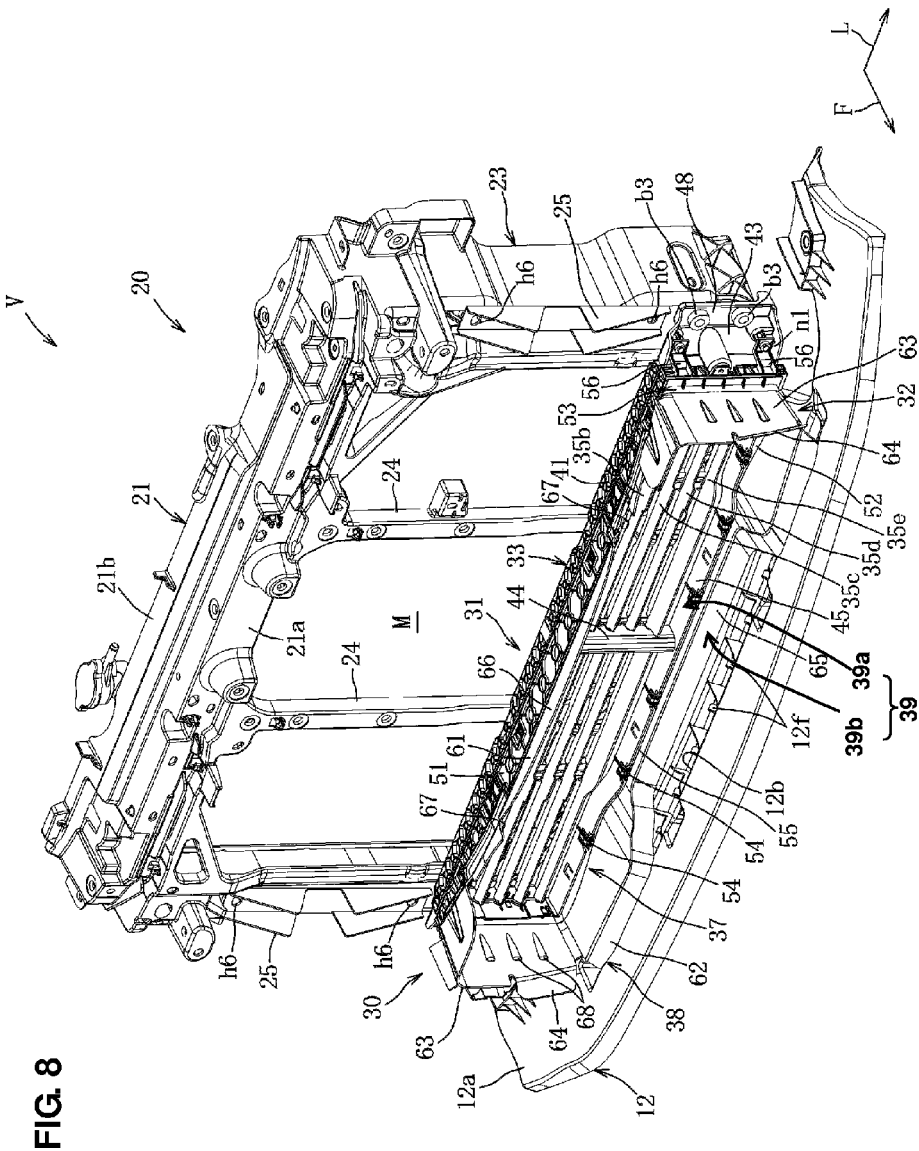
FIG. 8 is a view showing the state in which the bumper reinforcement is removed from the vehicle shown in FIG. 4.
Figure 9:
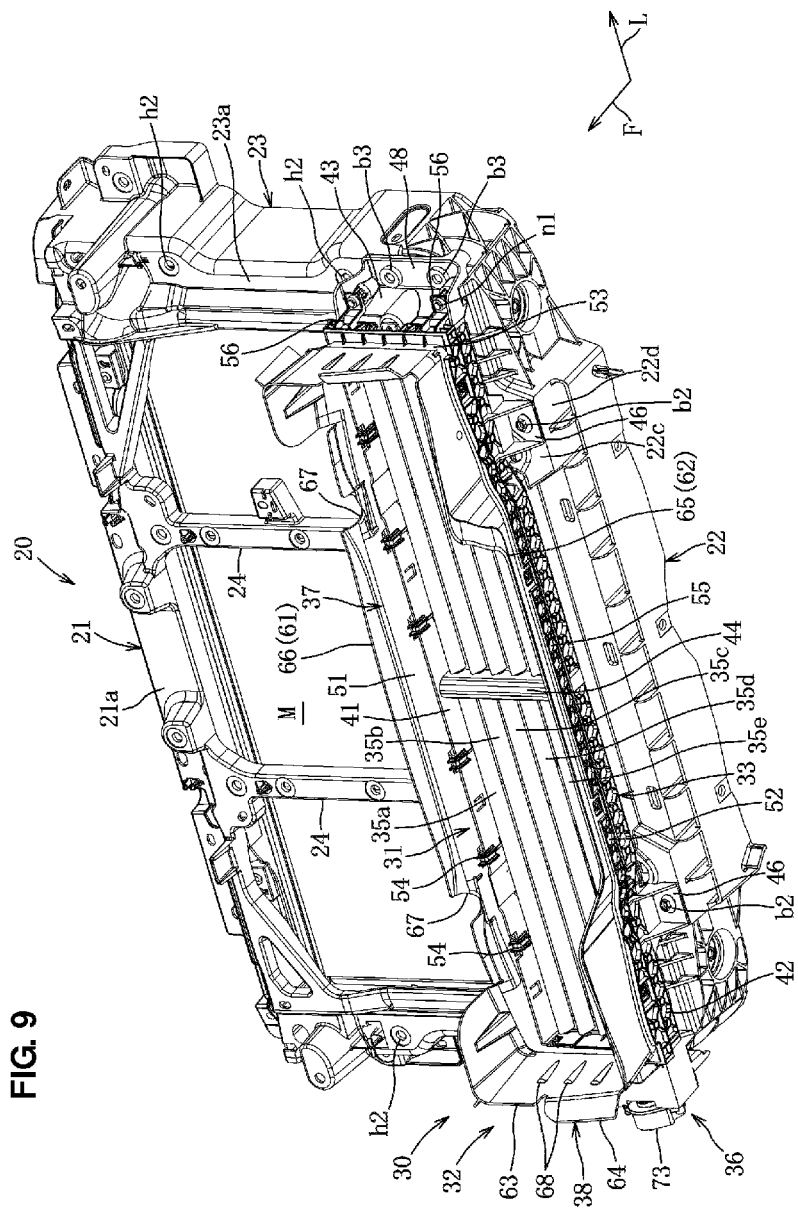
FIG. 9 is a perspective view of a shroud member to which a grill shutter unit is attached.

As shown in FIGS. 3 and 4, a pair of right-and-left front sub frames 9 which extend longitudinally are provided below the pair of right-and-left front side frames 1, and a front cross member 10 is arranged to extend in the vehicle width direction and interconnect both front ends of the pair of right-and-left front sub frames 9. A pair of right-and-left extension portion 11 which are formed in a quadrilateral tube shape and extend forward at a position corresponding to the pair of right-and-left crash cans 2 in the plan view are connected to front ends of the pair of right-and-left front sub frames 9. A leg sweeping member 12 extending in the vehicle width direction is attached to front ends of the pair of right-and-left extension portion 11.

The leg sweeping member 12 is a mechanism operative to protect a pedestrian by sweeping pedestrian's legs away in a case in which the vehicle contacts the pedestrian. The leg sweeping member 12 is made of a synthetic-resin molded body and formed curving forward at a central portion thereof. Both right-and-left end portions which extend rearward are fixed to lower ends of the pair of right-and-left extension portion 11. As shown in FIGS. 3-8, the leg sweeping member 12 comprises a plate portion 12a which extends substantially horizontally at a center portion and its vicinity thereof, a V-shaped groove 12b which is formed at a front-side and central portion of the plate portion 12a, extending in the vehicle width direction and having a V-shaped cross section, plural grid-shaped rib portions 12c which are formed at a lower face (back face) of the leg sweeping member 12, and others.

The leg sweeping member 12 is arranged such that it is located substantially at the same level as the front cross member 10 in an elevational view, a rear end portion of the plate portion 12a thereof is positioned slightly below the level of a front-side portion of the plate portion 12a, and it faces the front wall portion of the front cross member 10. Further, the leg sweeping member 12 has a step portion which faces a front face of a lower member 22 of the shroud member 20 at a specified portion which is located in front of a rear end portion thereof, whereby a leg-flicking load can be transmitted to the lower member 22. The V-shaped groove 12b extends in the vehicle width direction, being depressed downward. Accordingly, in a case in which some object which is harder than the pedestrian hits against the leg sweeping member 12 so that an excessive (large) load is inputted, the leg sweeping member 12 bends downward easily (see its illustration shown by a one-dotted broken line in FIG. 13). Consequently, its interference with the grill shutter unit 30 can be prevented and the excessive (large) load may not be transmitted to the lower member 22. The V-shaped groove 12b collects water flowing down from shutter members 35a-35e, which will be described later, and remains on the plate portion 12a, and drains the water collected through plural drain holes 12f which are formed at the bottom thereof. Herein, any kind of shape, such as a U shape or a rectangular shape, not limited to the V shape, is applicable to the groove 12b as long as the leg sweeping member 12 can bend downward easily.

Figure 2:
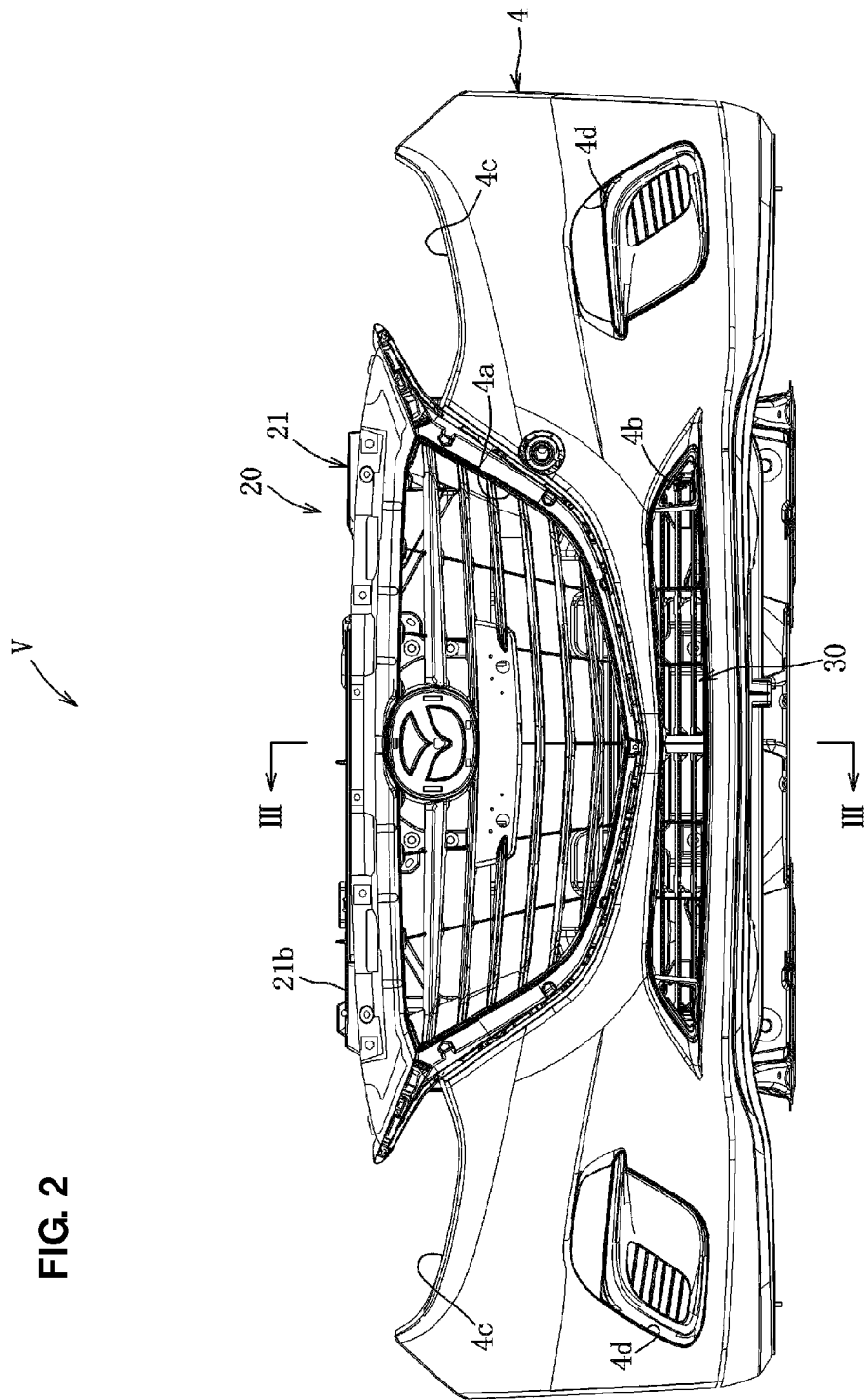
FIG. 2 is an elevational view of FIG. 1.

As shown in FIGS. 1-3, the bumper face 4 is arranged in front of the bumper reinforcement 3, the impact-absorbing body 8, the leg sweeping member 12 and others, and it is made from a hard synthetic resin material (PP, for example) so as to form an outer surface of the vehicle V. Thus, the bumper face 4 covers the bumper reinforcement 3, the grill shutter unit 30 and others. This bumper face 4 comprises a front grill 4a which is provided at a central portion thereof, facing the impact-absorbing body 8, a bumper grill 4b which is provided below the front grill 4a, a pair of right-and-left head-light attachment openings 4c, a pair of right-and-left winker attachment openings 4d, and others.

As shown in FIG. 2, the bumper grill 4b is formed substantially in a flat shape extending in the vehicle width direction such that it has substantially the same length in the vehicle width direction as the front grill 4a in the elevational view. A lower edge portion of the bumper grill 4b is located substantially at the same level as the front wall portion of the front cross member 10. In the present embodiment, the lower wall portion 8a and the lower horizontal wall portion 6e are positioned so as to correspond to an upper-side outer peripheral wall face of a traveling-air introductory port of the grill shutter unit 30, and a lower edge portion of the bumper grill 4b and an upper face of the front-side portion of the plate portion 12a are positioned so as to correspond to a lower-side outer peripheral wall face of the traveling-air introductory port of the grill shutter unit 30.

Next, the shroud member 20 will be described. As shown in FIGS. 1-9 and 11, the shroud member 20 is arranged substantially vertically behind the bumper reinforcement 3, to which a radiator 15, a condenser (not illustrated) and others are attached. The shroud member 20, which is made from a hard synthetic resin material, comprises an upper member 21 which extends laterally and supports an upper portion of the radiator 15, the above-described lower member 22 which extends laterally and supports a lower portion of the radiator 15, a pair of right-and-left side members 23 and others which respectively interconnect both right-and-left ends portions of the upper member 21 and the lower member 22, and a pair of right-and-left stay portions 24 which vertically interconnect respective middle portions of the upper member 21 and the lower member 22, which are integrally formed together substantially in a rectangular frame shape in the elevational view.

As shown in FIGS. 1-9 and 11, the upper member 21 is configured to have substantially an L-shaped cross section and comprises a front wall portion 21a and an upper wall portion 21b which extends rearward from an upper end of the front wall portion 21a. A pair of right-and-left support openings (not illustrated) to support the upper portion of the radiator 15 are formed at a left end portion and a right end portion of the upper wall portion 21b. As shown in FIGS. 3, 9 and 11-13, the lower member 22 is arranged near and in front of the front cross member 10, and comprises an upper-side front wall portion 22a, a middle step portion 22b which extends horizontally rearward from a lower end of the upper-side front wall portion 22a, a lower-side front wall portion 22c which extends vertically downward from a rear end of the middle step portion 22b, and a lower wall portion 22d which extends rearward from a lower end of the lower-side front wall portion 22c.

Figure 11:
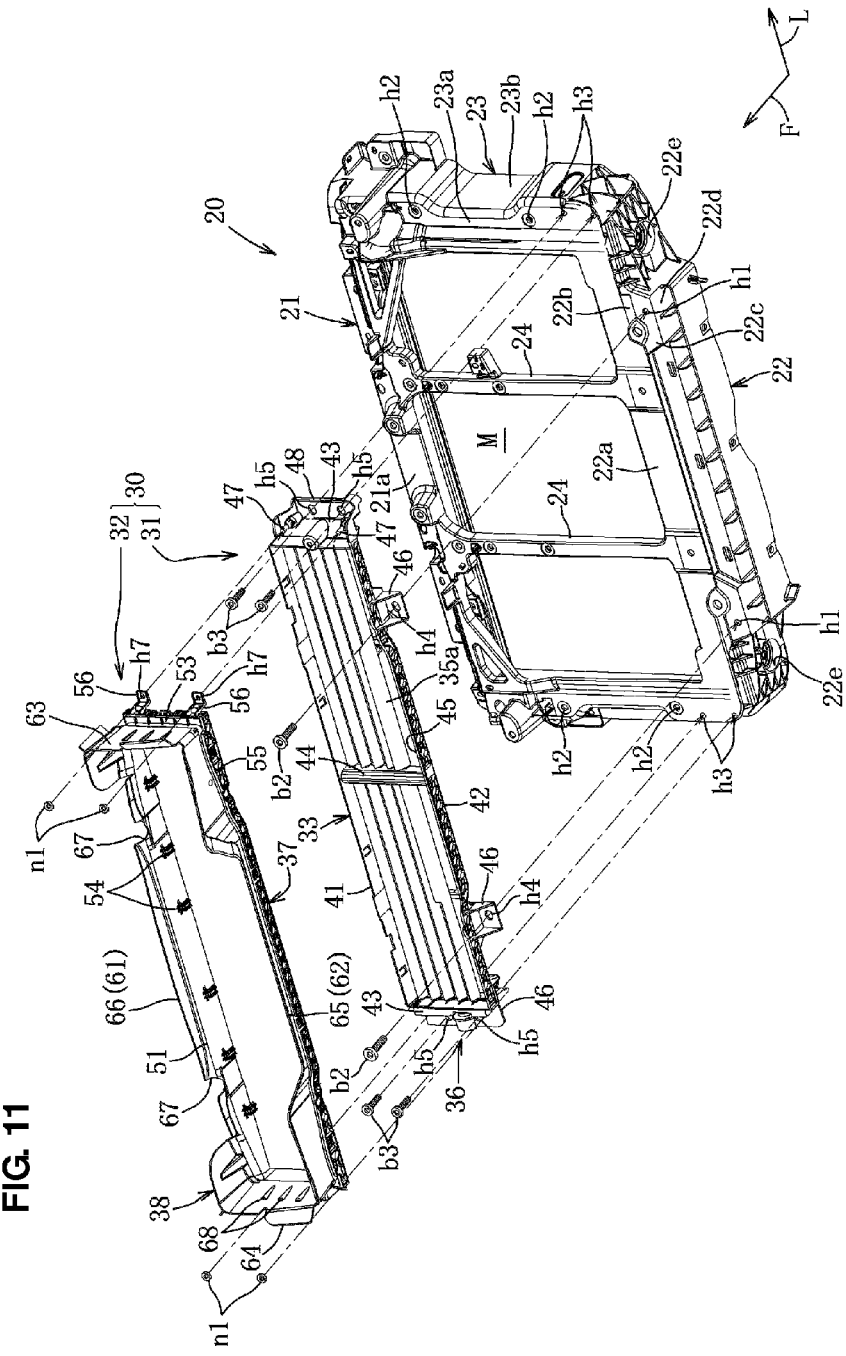
FIG. 11 is an exploded perspective view of the vehicle shown in FIG. 8.

As shown in FIG. 11, a pair of right-and-left bolt holes h1 to attach the grill shutter unit 30 are formed at a left-side position and a right-side position of the lower-side front wall portion 22c. The lower wall portion 22d is arranged on the rear end portion of the plate portion 12a located at a low level, and a pair of right-and-left support openings 22e to support the lower portion of the radiator 15 are formed at a left end portion and a right end portion of the lower wall portion 22d.

The pair of right-and-left side members 23 are configured to have an L-shaped cross section, and each of the side members 23 comprises a front wall portion 23a and a lateral wall portion 23b which extends rearward from an outward end, in the vehicle width direction, of the front wall portion 23a. The pair of right-and-left side members 23 have a symmetrical structure, so the left-side side member 23 will be described mainly. At a middle step portion of the front wall portion 23a are formed a pair of upper-and-lower bolt holes h2 to support the shroud member 20 at the bumper reinforcement 3 and a pair of upper-and-lower bolt holes h3 to attach the grill shutter unit 30 at a position below the bolt holes h2. The shroud member 20 is fixed to the bumper reinforcement 3 by fastening the bolt holes h6 (see FIGS. 7 and 8) of the attaching brackets 25 which have been previously joined to the bumper reinforcement 3 and the bolt holes h2 (see FIGS. 9 and 11) of the side members 23 with bolts b4 (see FIGS. 4 and 5). Thereby, the shroud member 20 is integrally connected to the bumper reinforcement 3, so that the shroud member 20 moves rearward synchronously as the bumper reinforcement 3 retreats.

Next, the grill shutter unit 30 will be described. The grill shutter unit 30 is a traveling-air amount adjusting mechanism which is configured to allow introduction of the traveling air into the engine room when the vehicle V is in a specified driving state and to restrict the traveling air flowing into the engine room when the vehicle V is another state (a state before a vehicle's warming-up, for example). As shown in FIG. 3, the grill shutter unit 30 is arranged below the bumper reinforcement 3 and above the plate portion 12a of the leg sweeping member 12 so as to overlap a portion of the lower-side portion of the front grill 4a and the bumper grill 4b in the elevational view. As shown in FIG. 11, the grill shutter unit 30 is attached to the pair of right-and-left bolt holes h1 formed at the lower-side front wall portion 22c of the shroud member 20 and the pair of upper-and-lower bolt holes h3 formed at the pair of right-and-left front wall portions 23a by means of the bolts b2, b3.

As shown in FIGS. 3-13, the grill shutter unit 30 is formed in a quadrilateral tube shape by the shutter unit 31 and the traveling-air guide member 32 which is attachable to an outer peripheral edge portion of the shutter unit 31. The shutter unit 31 comprises a unit frame portion 33 which is formed in a quadrilateral tube shape, plural rotational axes 34a-34e which are pivotally supported at the unit frame portion 33 and extend laterally, plural shutter members 35a-35e which are attached to the plural rotational axes 34a-34e so as to be operative to open or close respectively, a drive means 36 including a link mechanism (not illustrated) and an actuator which drives the plural shutter members 35a-35e.

As shown in FIGS. 8-11, the unit frame portion 33 is made from a hard synthetic resin material (PP, for example), and comprises an upper wall portion 41, a lower wall portion 42, a pair of right-and-left side wall portions 43, a support portion 44 which interconnects the upper wall portion 41 and the lower wall portion 42 at the central position in the vehicle width direction and pivotally supports the plural rotational axes 34a-34e, and others. The lower wall portion 42 is arranged below the middle step portion 22b, and includes a unit-side recess portion 45 which is concaved downward at a central portion thereof and a pair of right-and-left attachment flange portions 46 which project downward from both-end positions of a rear end of the lower wall portion 42.

The unit-side recess portion 45 is configured to have a level (height) which is lower than that of its left portion and its right portion, and also it has a length in the vehicle width direction which is about half of that of the lower wall portion 42 so as to correspond to the V-shaped groove 12b in the plan view. The pair of right-and-left attachment flange portions 46 have bolt holes h4 to attach the shutter unit 31 to the shroud member 20 at positions corresponding to the pair of right-and-left bolt holes h1 formed at the lower-side front wall portion 22c.

As shown in FIGS. 8-11, the pair of right-and-left side wall portions 43 comprise a pair of right-and-left attachment flange portions 48 which project outward from a rear end portion thereof and a pair of upper-and-lower bolt portions 47 which extend forward from an upper portion and a lower portion of the pair of right-and-left attachment flange portions 48. The pair of right-and-left attachment flange portions 48 have a pair of upper-and-lower bolt holes h5 to attach the shutter unit 31 to shroud member 20 at positions which correspond to the pair of upper-and-lower bolt holes h3. At the right-side wall portion 43 is provided the above-described drive means 36 to drive the plural shutter members 35a-35e.

As shown in FIGS. 12 and 13, the plural rotational axes 34a-34e are connected to respective central portions, in a vertical direction, of the plural shutter members 35a-35e, and synchronously rotate the plural shutter members 35a-35e by being rotated around their axial centers by means of the link mechanism. The lowermost shutter member 35e of the plural shutter members 35a-35e is configured so as to correspond to the unit-side recess portion 45, that is—it is configured such that its upper edge portion is substantially straight and a central portion, in the vehicle width direction, of its lower edge portion is concaved downward. The lowermost shutter member 35e is also configured such that a vertical width of its central portion in the vehicle width direction is greater than that of the other portion. The shutter members 35a-35d are configured in a rectangular shape, respectively.

Hereinafter, the traveling-air guide member 32 will be described. As shown in FIGS. 8-13, the traveling-air guide member 32 comprises a guide frame portion 37 which is formed in a quadrilateral tube shape, a seal portion 38 which is formed in a quadrilateral tube shape and extends forward from a front end of the guide frame portion 37, and others, which are formed integrally together. The guide frame portion 37 is made from a hard synthetic resin material (PP, for example), and the seal portion 38 is made from a thermoplastic elastomer (TPE: silicon rubber, for example) having flexibility. In the present embodiment, the guide frame portion 37 is molded through the injection of the hard synthetic resin material into a primary mold space which is formed in a pair of molds, and subsequently the seal portion 38 is molded by injecting the thermoplastic elastomer into a secondary mold space which is created by expanding the primary mold space with the guide frame portion 37 arranged therein. Thus, the integral traveling-air guide member 32 is manufactured by a different-kind resin molding method. Since the traveling-air guide member 32 is manufactured by two different kinds of synthetic resin through substantially a one-time molding process as described above, the guide frame portion 37 and the seal portion 38 are integrally formed together with a high engagement force.

As shown in FIGS. 8-13, the guide frame portion 37 has an inner-peripheral size which is slightly larger than an outer-peripheral size of a front portion the unit frame portion 33 so that the guide frame portion 37 can be engaged tightly around the front portion of the unit frame portion 33, and the guide frame portion 37 comprises an upper wall portion 51, a lower wall portion 52, a pair of right-and-left side wall portions 53, plural engagement portions 54, two pairs of upper-and-lower leg portions 56, and others, which are formed integrally together. The upper wall portion 51 is arranged in back of a rear end portion of the bumper reinforcement 3 and configured such that a front end thereof projects forward, curving along a rear end portion of the bumper reinforcement 3 in the plan view.

The lower wall portion 52 includes a guide-side recess portion 55 which is concaved downward at its central portion so as to correspond to the unit-side recess portion 45, having a level (height) which is lower than that of its left portion and its right portion. At a lower face of the upper wall portion 51 and an upper face of the lower wall portion 52 are formed plural engagement portions 54 having substantially an L-shaped cross section which can be engaged with a front-side portion of the unit frame portion 33 from inside. Thereby, when the traveling-air guide member 32 is assembled to the shutter unit 31 from the front, a rear-side inner peripheral portion of the guide frame portion 37 is engaged tightly around a front end portion of an outer peripheral portion of the unit frame portion 33 and the plural engagement portions 54 are engaged with the front end portion of the inner peripheral portion of the unit frame portion 33.

As shown in FIGS. 8-11, each of the pair of right-and-left side wall portions 53 of the guide frame portion 37 includes a pair of upper-and-lower leg portions 56 which extend rearward slightly from an upper end portion and a lower end portion and project outward in the vehicle width direction. Each leg portion 56 has a bolt hole h7 to fix the traveling-air guide member 32 to the shutter unit 31 at a position which corresponds to each bolt portion 47 of the unit frame portion 33.

As shown in FIGS. 8-13, the seal portion 38 is configured to be continuous forward from a front end of the guide frame portion 3. The seal portion 38 comprises an upper-side seal portion 61, a lower-side seal portion 62 (lower wall portion), a pair of right-and-left side seal portions 63, a pair of right-and-left projecting seal portions 64 which project outward in the vehicle width direction from respective front end portions of the pair of right-and-left side seal portions 63, and others.

The upper-side seal portion 61 comprises an upper-side central seal portion 66 which is provided at a central portion thereof to extend close to the lower wall portion 8a of the impact absorbing body 8 and a pair of right-and-left cut-out portions 67 which are formed at a right-side portion and a left-side portion thereof. The upper-side central seal portion 66 is configured such that its front portion is positioned at a higher level than its rear portion, and it is arranged closely such that there exists a gap S between an upper face of the upper-side central seal portion 66 and the lower wall portion 8a of the impact absorbing body 8 and the lower horizontal wall portion 6e of the bumper reinforcement 3 when being assembled (at a stop of the vehicle V) (see FIG. 13). The upper-side central seal portion 66 is configured to flexibly deform upward due to an increase of the air pressure below the upper-side central seal portion 66 which is caused by the traveling air (arrows), the flowing of which is shut off by the closed shutter members 35a-35e (see FIG. 12).

Figure 10:
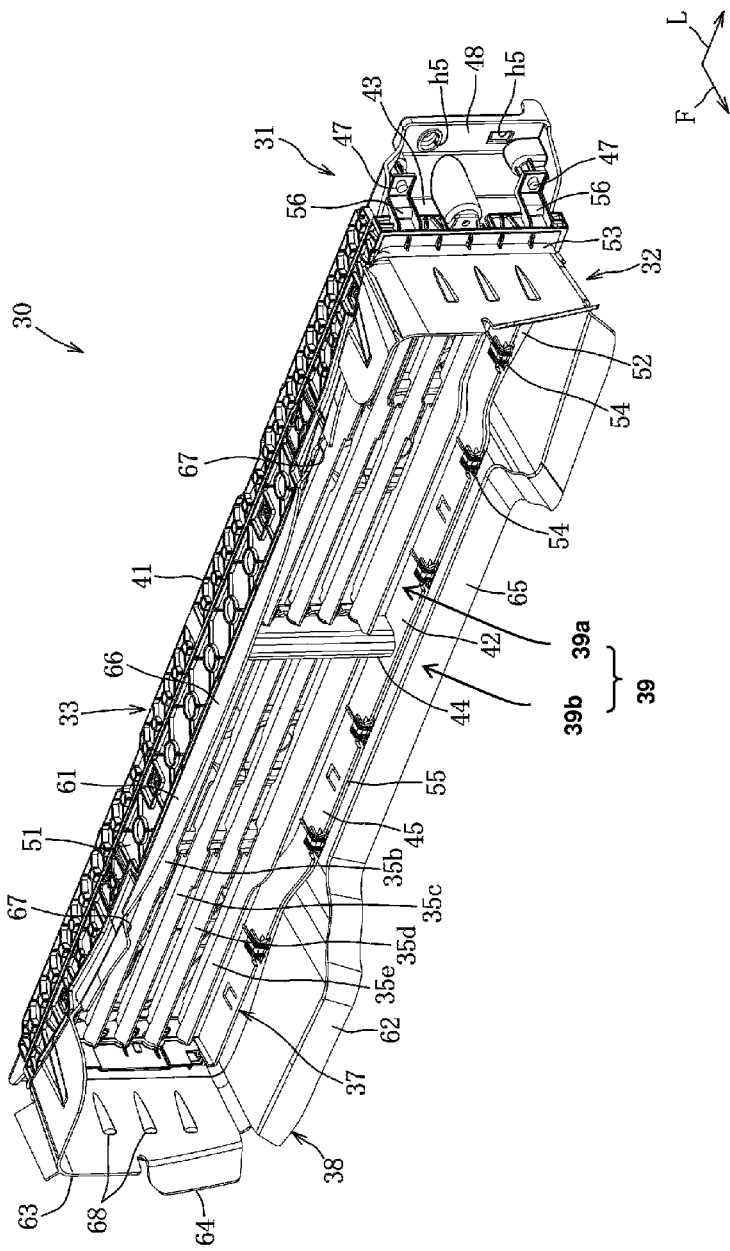
FIG. 10 is a perspective view of the grill shutter unit.

As shown in FIGS. 10-11, the pair of right-and-left cut-out portions 67 are configured such that the front end of the upper-side seal portion 61 retreats up to a position located near the rear end of the upper-side seal portion 61 at both sides of the upper-side seal portion 61. Accordingly, the upper-side central seal portion 66 is not influenced by the rigidity (which is generally high) of the both-side corner portions (the side seal portions 63) of the upper-side seal portion 61. Consequently, the front end of the upper-side central seal portion 66 can be easily pressed against the lower wall portion 8a of the impact absorbing body 8 and the lower horizontal wall portion 6e of the bumper reinforcement 3 by the increased air pressure below the upper-side central seal portion 66 when the plural shutter members 35a-35e are closed.

As shown in FIGS. 12 and 13, the lower-side seal portion 62 is configured such that it slants forward and downward and a lower face of its front end is pressed against the upper face of the plate portion 12a of the leg sweeping member 12 over its entire length in the vehicle width direction. The lower-side seal portion 62 includes a seal-side recess portion 65 which is concaved downward at its central portion so as to correspond to the guide-side recess portion 55, having a level (height) which is lower than those of both its left portion and its right portion. Further, the lower-side seal portion 62 covers over right-and-left side portions of the V-shaped groove 12b, so that a turbulent flow caused by the V-shaped groove 12b and an air leak from the drain holes 12f can be properly restrained, thereby reducing the traveling resistance. The seal-side recess portion 65 is configured such that it slants forward and downward and its front end is pressed against the upper face of the plate portion 12a at a position located near an upper end of a rear side of the V-shaped groove 12b.

The pair of right-and-left side seal portions 63 are configured such that a longitudinal length thereof is longer than those of the upper-side central seal portion 66 and the seal-side recess portion 65, so that the pair of right-and-left side seal portions 63 are pressed against respective back faces of right-and-left side portions of the bumper face 4 all the time. The pair of right-and-left projecting seal portions 64 projecting outward in the vehicle width direction are provided at both-outward positions of the pair of right-and-left side seal portions 63. Plural rib portions 68 which extend inward and longitudinally are provided at the pair of right-and-left side seal portions 63.

Next, a recess portion for draining 39 will be described. As shown in FIGS. 8-11, the recess portion for draining 39 comprises a collection portion 39a which collects water attaching itself onto the plural shutter members 35a-35e, such as rain or water, melt snow or the like which are splashed from a road surface, and a slant portion 39b which guides the collected water.

Specifically, the collection portion 39a is substantially comprised of the above-described unit-side recess portion 45 provided at the lower wall portion 42 of the unit frame portion 33, the above-described guide-side recess portion 55 provided at the lower wall portion 52 of the guide frame portion 37, and the above-described seal-side recess portion 65 formed at the lower seal portion 62 of the seal portion 38. Meanwhile, the slant portion 39b is substantially comprised of a portion of the above-described seal-side recess portion 65 which is configured to slant forward and downward. Herein, the slant portion 39b is configured such that its front end is pressed against the upper face of the plate portion 12a at the position located near the upper end of the rear side of the V-shaped groove 12b.

Accordingly, when the water attaching itself onto the plural shutter members 35a-35e flows down to the lower wall portion 42, the flowing-down water is collected by the collection portion 39a, and the collected water flows over the slant portion 39b and then into the V-shaped groove 12b. The water flowing into the V-shaped groove 12b drains outside through the plural drain holes 12f. Thus, the amount of the water remaining on the lower wall portion 42 can be minimized, so that any operational (opening/closing) deterioration of the plural shutter members 35a-35e, which may be caused by the water freezing, can be properly restrained. Further, even if some water which has not drain through the drain holes 12*f* remains at the collection portion 39*a*, since the collection portion 39*a* has the length, in the vehicle width direction, which is shorter than the entire width of the lower wall portion 42, the amount of the remaining water may be so small that even if this remaining water freezes, this freezing water may not deteriorate the opening/closing operation of the shutter members 35*a*-35*e* driven by the drive means 36 substantially.

Next, assembly steps of the grill shutter unit 30 will be described. First, the shroud member 20 is assembled to the bumper reinforcement 3, to which the crash cans 2 and the attaching brackets 25 are connected, thereby constituting a shroud assembly body. The bolt holes h6 (see FIGS. 7 and 8) of the attaching brackets 25 connected to the bumper reinforcement 3 and the bolt holes h2 (see FIGS. 9 and 13) are overlapped with each other, then the bolts b4 (see FIGS. 4 and 5) are inserted into these bolt holes h2, h6 and fastened by means of fastening tools. Herein, some other members than the grill shutter unit 30 (the radiator 15 and others) have been installed to the shroud member 20. Then, the flanges 1*a* of the front side frames 1 and the flanges 2*a* of the crash cans 2 are fastened by the plural bolts b1, thereby assembling the shroud assembly body to the front side frames 1.

The grill shutter unit 30 which has been constituted by assembling the traveling-air guide member 32 to the shutter unit 31 from the front is prepared. As shown in FIG. 11, after the plural engagement portions 54 are made to be engaged with the front end portion of the inner peripheral portion of the unit frame portion 33, the bolt portions 47 of the shutter unit 31 are inserted into the bolt holes h7 of the leg portions 56 provided at the traveling-air guide member 32 and fastened by nuts n1, thereby constituting the grill shutter unit 30.

Then, the impact absorbing body 8 is attached to the front face of the closing plate 7 of the bumper reinforcement 3, and the grill shutter unit 30 is assembled to the lower portion of the front side of the shroud member 20. As shown in FIG. 13, after the bolt holes h4, h5 of the shutter unit 31 are overlapped with the bolt holes h1, h3 of the shroud member 20, the bolts b2, b3 are inserted into these bolt holes h1, h3, h4, h5 and fastened by means of fastening tools (not illustrated). Since the seal portion 38 of the traveling-air guide member 32 has some flexibility, any damage of the traveling-air guide member 32 which may be caused by its contact with members (the impact absorbing body 8, for example) provided around the traveling-air inductor port when the grill shutter unit 30 is assembled in back of the traveling-air inductor port of the front grill 4*a*, the bumper grill 4*b* and the like can be avoided. Accordingly, the assembling workability can be improved. Finally, after the leg sweeping member 12 is attached, the bumper face 4 is assembled, thereby completing the assembling work.

Hereinafter, the operation and effects of the grill shutter unit 30 of the vehicle V will be described. According to the grill shutter unit 30 of the vehicle V, substantially no gap is formed between the assembled traveling-air guide member 32 and the lower wall portion 8*a* of the impact absorbing body 8 and the lower horizontal wall portion 6*e*, which correspond to the traveling-air introductory port, when the shutter members 35*a*-35*e* are closed regardless of the design at the time of assembling. Thereby, the traveling air can be prevented from coming into the engine room. Accordingly, the fuel economy of the vehicle can be kept in an appropriate state. Further, since the traveling-air guide member 32 is provided to extend forward from the outer peripheral edge portion of the shutter unit 31, even in a case in which the vehicle has the head-on collision and accordingly the traveling-air guide member 32 gets broken, the repair can be accomplished substantially by exchanging only the traveling-air guide member 32 itself. Accordingly, the repairability can be improved.

The traveling-air guide member 32 comprises the guide frame portion 37 which is provided at the outer peripheral edge portion of the unit frame portion 33 of the shutter unit 31 and the seal portion 38 which is provided to extend forward continuously from the front end of the guide frame portion 37 and made from the soft synthetic resin having more flexibility than the guide frame portion 37. Thereby, since the guide frame portion 37 is provided at the outer peripheral edge portion of the unit frame portion 33 of the shutter unit 31, the support rigidity and the assembling workability of the traveling-air guide member 32 can be improved. Further, since the seal portion 38 of the traveling-air guide member 32 has some flexibility, any damage of the traveling-air guide member 32 which may be caused by its contact with the members provided around the traveling-air inductor port of the front grill 4*a*, the bumper grill 4*b* and the like when the grill shutter unit 30 is assembled in back of the traveling-air inductor port of the front grill 4*a*, the bumper grill 4*b* and the like can be avoided. Accordingly, the assembling workability can be improved. Moreover, the breakage prevention of the traveling-air guide member 32 can be achieved, and the fuel economy can be improved by the contacting of the traveling-air guide member 32 with the lower horizontal wall portion 6*e* and the like.

The vehicle V comprises the bumper reinforcement 3 and the shroud member 20 held at the bumper reinforcement 3, the lower horizontal wall portion 6*e* of the bumper reinforcement 3 is provided in the vicinity of the upper face of the upper-side central seal portion 66 of the seal portion 38 of the traveling-air guide member 32, and the shutter unit 31 is arranged in front of and near the shroud member 20 and fixed to the front wall portion 23*a* of the shroud member 20. Thereby, since the shroud member 20 moves rearward synchronously as the bumper reinforcement 3 retreats in the vehicle head-on collision, the breakage prevention of the traveling-air guide member 32 can be further properly achieved. After the shutter unit 31 and the shroud member 20 are previously assembled as an assembly unit, the traveling-air guide member 32 can be assembled to the shutter unit 31 in a subsequent step. Accordingly, the assembling workability can be further improved.

When the traveling-air guide member 32 is assembled to the shutter unit 31 fixed to the front wall portion 23*a* of the shroud member 20, there exists the gap S between the front end portion of the traveling-air guide member 32 and the bumper reinforcement 3. Thereby, assembling of the traveling-air guide member 32 to the shutter unit 31 can be facilitated.

The vehicle V comprises the leg sweeping member 12 which is provided at the lower portion of the front end of the vehicle body, the leg sweeping member 12 being configured to contact the lower face of the lower-side central seal portion 65 of the seal portion 38 of the traveling-air guide member 32. Thereby, the traveling air can be prevented from coming into the engine room by providing substantially no gap formed between the traveling-air guide member 32 and the traveling-air inductor port, ensuring the leg flicking. Accordingly, the fuel economy of the vehicle V can be kept in the appropriate state.

Further, since the recess portion for draining 39 is provided at the lower wall portion 42 of the shutter unit 31 and the lower wall and seal portions 52, 62 of the traveling-air guide member 32 so as to be concaved downward at the respective central portions, in the vehicle width direction, of the above-described portions 42, 52, 62, the water remaining around the lowermost shutter member 35*e* can be collected and removed by the recess portion for draining 39, so that the opening/closing deterioration of the plural shutter members 35a-35e, which may be caused by the water freezing, can be properly restrained.

Herein, since the recess portion for draining 39 includes the slant portion 39b which is configured to slant forward and downward, the collected water from around the lowermost shutter member 35e can be guided away from this shutter member 35e, so that the opening/closing deterioration of the shutter members 35a-35e can be further properly restrained.

Further, since the vehicle V comprises the leg sweeping member 12 provided at the lower portion of the front end of the vehicle body, the V-shaped groove 12b configured to be concaved downward at the central portion, in the vehicle width direction, of the leg sweeping member 12, and the plural drain holes 12f formed at the V-shaped groove 12b, and also the slant portion 39b is provided such that its front end contacts the rear-side portion of the V-shaped groove (the groove configured to be concaved downward) 12b, the water collected from around the shutter member can be drained outside through the plural drain holes 12f, so that the opening/closing deterioration of the shutter member 35a-35e can be surely restrained.

Finally, some modifications of the above-described embodiment will be described.

1) While the above-described embodiment shows an example of the grill shutter unit equipped with the plural shutter members, a single shutter member may be provided in order to open or close the traveling-air introductory port as long as a sufficient longitudinal length of the grill shutter unit can be ensured. Further, while the example of the grill shutter unit formed in the quadrilateral tube shape is described here, any shape is applicable.

2) While the above-described embodiment shows an example in which the grill shutter unit is fixed to the shroud member supported at the bumper reinforcement, the grill shutter unit may be fixed to the shroud member which is supported at the front side frame, or may be fixed to the bumper reinforcement or the front side frame via the attaching bracket or a sub frame, not to the shroud member.

3) The present invention should not be limited to the above-described embodiment and modifications, and any other modifications or improvements may be applied within the scope of a sprit of the present invention.

What is claimed is:

1. A grill shutter structure of a vehicle, comprising:
   a shutter unit provided in back of a traveling-air introductory port formed at a front end of a vehicle body and including a shutter member operative to be open or closed;
   a traveling-air guide member provided to extend forward from an outer peripheral edge portion of the shutter unit, the traveling-air guide member comprising a frame portion which is provided at the outer peripheral edge portion of the shutter unit and a seal portion which is provided to extend forward continuously from a front end of the frame portion and made from soft synthetic resin having more flexibility than the frame portion;
   a bumper reinforcement provided at the front end of the vehicle body; and
   a shroud member held at the bumper reinforcement,
   wherein a lower end portion of said bumper reinforcement is provided in the vicinity of an upper wall portion of the seal portion of the traveling-air guide member such that said seal portion of the traveling-air guide member is pressed against said lower end portion of the bumper reinforcement by air pressure when the vehicle is traveling and said shutter member is closed, and said shutter unit is arranged in front of and near said shroud member and fixed to a front wall portion of the shroud member.

2. The grill shutter structure of a vehicle of claim 1, wherein when said traveling-air guide member is assembled to said shutter unit fixed to the front wall portion of the shroud member, there exists a gap between the front end portion of the traveling-air guide member and said bumper reinforcement.

3. The grill shutter structure of a vehicle of claim 1, wherein the vehicle comprises a leg sweeping member which is provided at a lower portion of the front end of the vehicle body, the leg sweeping member being configured to contact a lower face of a lower wall portion of the seal portion of said traveling-air guide member.

4. The grill shutter structure of a vehicle of claim 3, wherein a recess portion for draining is provided at respective lower portions of said shutter unit and said traveling-air guide member, the recess portion for draining being configured to be concaved downward at respective central portions, in a vehicle width direction, of said respective lower portions.

5. The grill shutter structure of a vehicle of claim 4, wherein said recess portion for draining comprises a collection portion to collect water and a slant portion to guide the water collected by the collection portion, the slant portion being provided at a front end portion of the collection portion and slants forward and downward.

6. The grill shutter structure of a vehicle of claim 5, wherein there are provided a groove configured to be concaved downward at a central portion, in the vehicle width direction, of said leg sweeping member and plural drain holes formed at the groove, and said slant portion of the recess portion for draining is provided such that a front end thereof contacts a rear-side portion of the groove.

7. The grill shutter structure of a vehicle of claim 6, wherein said groove is configured to extend in the vehicle width direction so as to cause the leg sweeping member to bend downward at a point of the groove when a collision load is inputted to the leg sweeping member, and an outward side of said recess portion for draining is covered with a portion of said traveling-air guide member.

8. A grill shutter structure of a vehicle, comprising:
   a shutter unit provided in back of a traveling-air introductory port formed at a front end of a vehicle body and including a shutter member operative to be open or closed; and
   a traveling-air guide member provided to extend forward from an outer peripheral edge portion of the shutter unit,
   wherein said grill shutter structure is configured such that a front end portion of the traveling-air guide member is pressed against at least a portion of an outer peripheral wall face of the traveling-air introductory port by air pressure when the vehicle is traveling and said shutter member is closed, and
   a recess portion for draining is provided at respective lower portions of said shutter unit and said traveling-air guide member, the recess portion for draining being configured to be concaved downward at respective central portions, in a vehicle width direction, of said respective lower portions.

9. A grill shutter structure of a vehicle, comprising:
   a shutter unit provided in back of a traveling-air introductory port formed at a front end of a vehicle body and including a shutter member operative to be open or closed; and
   a traveling-air guide member provided to extend forward from an outer peripheral edge portion of the shutter unit, wherein said grill shutter structure is configured such that a front end portion of the traveling-air guide member is pressed against at least a portion of an outer peripheral wall face of the traveling-air introductory port by air pressure when the vehicle is traveling and said shutter member is closed, and a portion of said front end portion of the traveling-air guide member is configured to slant so as to expand forward and outward, and a cut-out portion for promoting deformation is formed at a position of the front end portion which is located between said slant-shaped portion and a side corner portion of the front end portion.

\* \* \* \* \*